United States Patent [19]  [11] 3,807,692
Usab et al.  [45] Apr. 30, 1974

[54] VALVE, METHOD OF MANUFACTURE OF VALVE AND VALVE MADE BY SUCH METHOD

[75] Inventors: Martin A. Usab, Santa Ana; Peter J. Stulik, Newport Beach, both of Calif.

[73] Assignee: Dynatech Corp., Santa Ana, Calif.

[22] Filed: May 1, 1972

[21] Appl. No.: 249,186

[52] U.S. Cl. ............................... 251/315, 251/309
[51] Int. Cl. ............................................. F16k 5/06
[58] Field of Search ........... 251/315, 309, 312, 316, 251/317

[56] References Cited
UNITED STATES PATENTS

| | | | |
|---|---|---|---|
| 3,067,978 | 12/1962 | Natho | 251/315 X |
| 3,394,916 | 7/1968 | Birr | 251/315 |
| 3,698,687 | 10/1972 | Kitamura | 251/315 |
| 2,726,676 | 12/1955 | Manning | 251/362 X |
| 3,359,999 | 12/1967 | Mueller | 251/315 X |
| 3,380,708 | 4/1968 | Scaramucci | 251/315 X |
| 3,458,171 | 7/1969 | Urban | 251/315 X |
| 3,635,439 | 1/1972 | McNally | 251/315 |
| 3,704,003 | 11/1972 | Harter | 251/312 |

Primary Examiner—William R. Cline
Assistant Examiner—Ira S. Lazarus
Attorney, Agent, or Firm—Christie, Parker & Hale

[57] ABSTRACT

A rotary valve having a rotary member with an outer surface forming at least a segment of a sphere. A passage extends through to opposite sides of the segment. An annular recess is in the segment abutting and surrounding each end of the passage. A housing rotatably mounts the rotary member therein and has a passage therethrough comprising a passage portion that is alignable with the rotary member passage and has a larger perimeter than the inside perimeter of the recess. A pair of resilient annular seals are fixed in between the housing and rotary member. One seal is around each end of the segment passage. The seals extend into the housing member passage into abutting sealing engagement with the annular recesses.

A process is disclosed for making the aforementioned valve by mounting the seals and rotary member on a core and inserting the resultant assembly in a mold and preloading the seals while molding molten material therearound to form the housing.

A product made by the aforementioned process is also disclosed.

12 Claims, 5 Drawing Figures

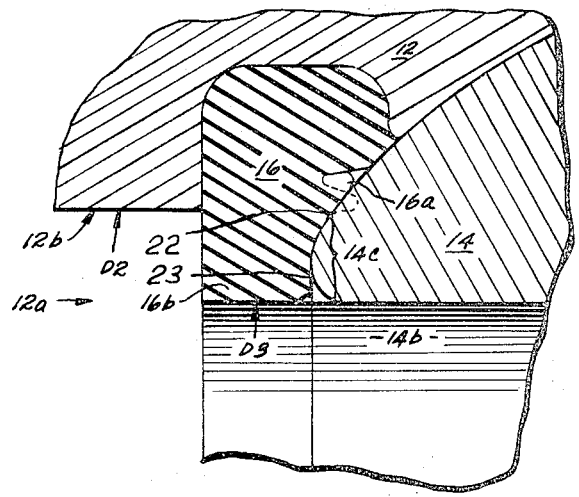
FIG_3
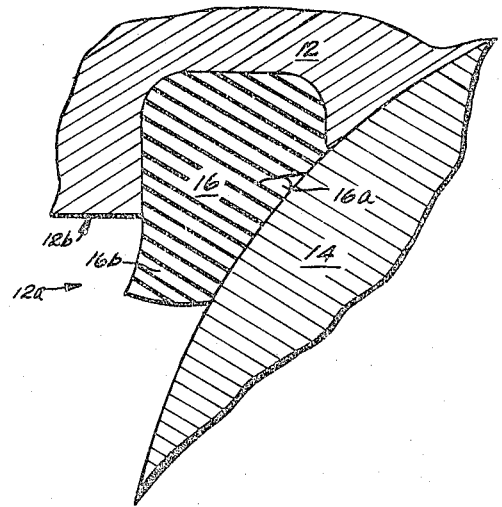
FIG_4
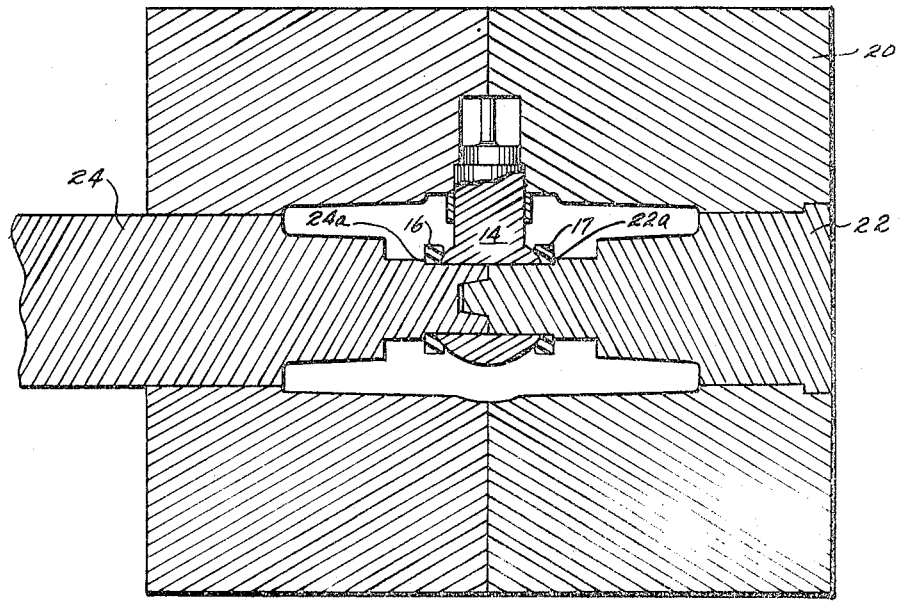
FIG_5

VALVE, METHOD OF MANUFACTURE OF VALVE AND VALVE MADE BY SUCH METHOD

BACKGROUND OF THE INVENTION

This invention relates to ball valves, a process for manufacturing such ball valves, and a ball valve made by such process.

Ball valves are generally known which have a generally spherical-shaped rotary ball mounted inside of a housing. A passage is provided through the ball and an alignable passage is provided through the housing so that when the ball is rotated into alignment with the housing passage, fluid may pass through the ball and housing.

With improvements in plastics and methods for injection molding of plastics, ball valves have been made out of plastic parts. One method of making a ball valve out of plastic involves the process of prefabricating a ball with a passage, prefabricating housing halves, and then assembling the housing halves about the prefabricated ball. However, this process is expensive and it is difficult to make a good seal around the ball. In order to improve the seal, ring-shaped seals have been provided in between the housing and ball, one around each end of the ball passage, so as to provide a better seal in between the housing and the ball. However, such an arrangement is unsatisfactory where a high quality seal is required and the cost of manufacture is quite high.

To reduce the costs of manufacturing plastic ball valves, it has been proposed to mount a prefabricated ball with a passage therethrough on a core with a pair of seals, one seal mounted on each end of the passage through the ball. The core with mounted ball and seals is then mounted inside of a mold and molten plastic is injected around the assembly to form a housing. After the plastic has set, the housing and core is removed from the housing, ball and seals, leaving a completed ball valve. However, the outside diameter of the core is constant and the inside diameter of the passage through the ball, the seals and the housing are all of the same diameter. As a result, the aforementioned proposal has a serious deficiency in that there is no teaching of a way in which the seal rings can be held against the ball to prevent the high pressure injected plastic from seeping in between the seal and the ball. Hence, an unacceptable valve is produced which does not provide a good seal in between the ball and seals.

To overcome the inoperability and deficiencies of the aforementioned process and resultant valve, it has been proposed that the seals be placed in retaining bushings and that the core be split into halves with a shoulder on each half. The retaining bushings with mounted seal rings are placed one against a shoulder on each of the core halves and then the core halves are inserted through the passage in the prefabricated ball. The resultant assembly is placed in a mold and pressure is applied in between the core halves, causing the shoulders to press the seals in the retaining bushings tightly against the ball as molten plastic is injected to form the housing. This process is costly because it requires the seal rings to be mounted in the retaining bushing and, quite significantly, when high quality seals are required, the resultant valve is ineffective as it does not provide an adequate seal against the ball to prevent liquid from seeping through the valve when in a shut-off condition.

It has also been proposed to preload the seals in the aforementioned process so that following the molding process, the seal rings are in a state of compression against the ball. However, it has been found that this still does not provide an adequate seal to prevent seepage of fluid through the valve in a shut-off condition.

In summary, none of the foregoing processes provide an adequate seal to prevent the seepage of fluid through the valve. Additionally, as the valve is used and the seals and ball wear, leakage increases and the life of the valves produced by the aforementioned processes is quite limited.

SUMMARY OF THE INVENTION

The present invention is directed to a valve, a method for producing such a valve, and a product made by such process which, for the first time, provides a high quality seal in between the housing and ball which is fluid-tight. In other words, for the first time, a seal is provided which completely stops the flow of fluid through the valve when in a shut-off condition.

A rotary valve according to the present invention has a rotary member with an outer surface forming at least a segment of a sphere. A passage is made through to opposite sides of the segment. Significantly, an annular recessed surface is provided in the segment abutting and surrounding each end of the passage. The housing rotatably mounts the rotary member therein and also has a passage therethrough. The housing passage has a passage portion that is alignable with the rotary member passage and has a larger perimeter than the inside perimeter of the recessed surfaces. A pair of resilient annular seals are fixed on opposite sides of the sphere in between the housing and rotary member. The seals each have an annular portion which extends inwardly into the member housing passage. Each annular seal portion extends into abutting sealing engagement in an annular shape with the respective annular recessed surface when the passages are aligned. As a result, when the rotary member is rotated so that the passages are in alignment, the seals are in their normal position and fluid may pass through the valve. However, when the rotary member is rotated so that the passages are out of alignment, the portion of the seals exposed in the passage rides up on the larger diameter of the spherical segment outside of the recessed area and resiliency of the seals cause a tighter seal then has heretofore been possible. It should now be seen that the seals, because of this action, form dynamic seals with a portion moving in an axial direction as the rotary member is rotated from an open to a shut-off position. Preferably, all of the aforementioned parts of the valve are made of a plastic material.

A method of manufacturing a rotary valve according to the present invention comprises the following steps. First, a rotary member is preformed having an outer bearing and sealing surface forming at least a segment of a sphere. A circular passage extends through the segment and a ring-shaped recess is provided in the segment surrounding and abutting each end of the passage. An elastic, ring-shaped sealing ring is preformed and has a sealing wall. The member along with one of the seal rings at each end of the passage is mounted on a core. At least a portion of the sealing wall of each of the sealing rings is abutting the corresponding recess surface and the core passes completely through the rings and passage. The resultant assembly is placed into a mold having an inner configuration corresponding to the desired outer configuration of the housing. The core has a boss adjacent each sealing ring which holds the rings preloaded against the corresponding recessed surface, while leaving a portion of the rings radial to the core exposed. Molten material is injected into the mold around the core, the member and the preloaded sealing rings, and allowed to harden and form a housing thereabout. Subsequently, the housing, rotary member and rings are removed from the mold and core after the housing has set. The aforementioned process thereby provides a substantially improved process for making a valve wherein a fluid-tight seal is made in between the seal and rotary member.

According to the present invention, a product is made according to the aforementioned process.

BRIEF DESCRIPTION OF THE DRAWINGS

FIG. 3 is an enlarged view of the portion of the ball, seal and housing, indicated by dashed lines in FIG. 1. The ball is shown in an open position with its passage aligned with the housing passage;

FIG. 4 is a view similar to FIG. 3 but with the ball rotated to a shut-off position so that the ball passage and housing passage are out of alignment; and FIG. 5 is a section view through a mold, the cores, the ball and seal rings used in the process according to the present invention.

DETAILED DESCRIPTION

Figure 1:
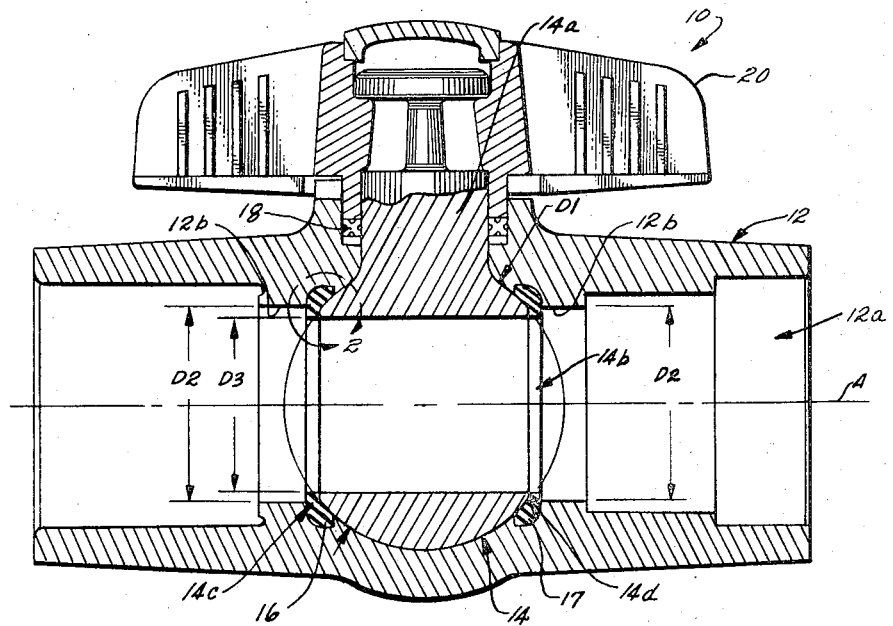
FIG. 1 is a cross-sectional view of a valve, embodying the present invention, taken through the stem and the longitudinal axis of the valve.

FIG. 1 depicts the cross-sectional view of a ball valve 10. The valve 10 includes a housing 12 having rotatably mounted therein a rotary member or ball 14 having as an integral part thereof a stem 14a. The ball 14 has a cylindrical-shaped passage 14b extending concentric with an axis A from one side of the ball 14 to the other. The ball 14 has a substantially spherical outer surface segment having a diameter D1 extending from the base of the stem 14a.

A pair of annular-shaped seals 16 and 17, made of a plastic material such as Teflon, is positioned at opposite ends of the passage 14b. An annulus is provided in between the housing 12 and each side of the ball 14 into which an enlarged portion of the seals extend and which securely holds the seals 16 and 17 in place against the ball.

Of considerable importance to the present invention are ring-shaped recessed surfaces 14c and 14d provided in the spherical segment of the ball 14 at each end of the passage 14b. To be explained in more detail, the annular recessed surfaces 14c and 14d allow the seals 16 and 17 to provide a tighter seal against the remaining spherical surface of the ball 14 when the ball is rotated to a shut-off condition.

The upper end of the stem 14a is rigidly secured to a handle 20 which may be used for manually turning the ball valve to open and shut-off conditions. Although of no significance to the present invention, a seal 18 is provided around the stem 14a to prevent fluid from seeping up past the stem out of the valve. A flange on the handle 19 holds the seal 18 in place.

Of importance to the present invention is the fact that the passage 14b has a smaller perimeter or diameter D3 than the perimeter or diameter of the portion 12b of the circular passage 12a which is immediately adjacent to the ball 14. Also of importance is the fact that the seals 16 and 17 each have an annular portion which extends inwardly toward the axis A into the passage portion 12b and into abutting sealing engagement with the annular recessed surfaces 14c and 14d.

Figure 2:
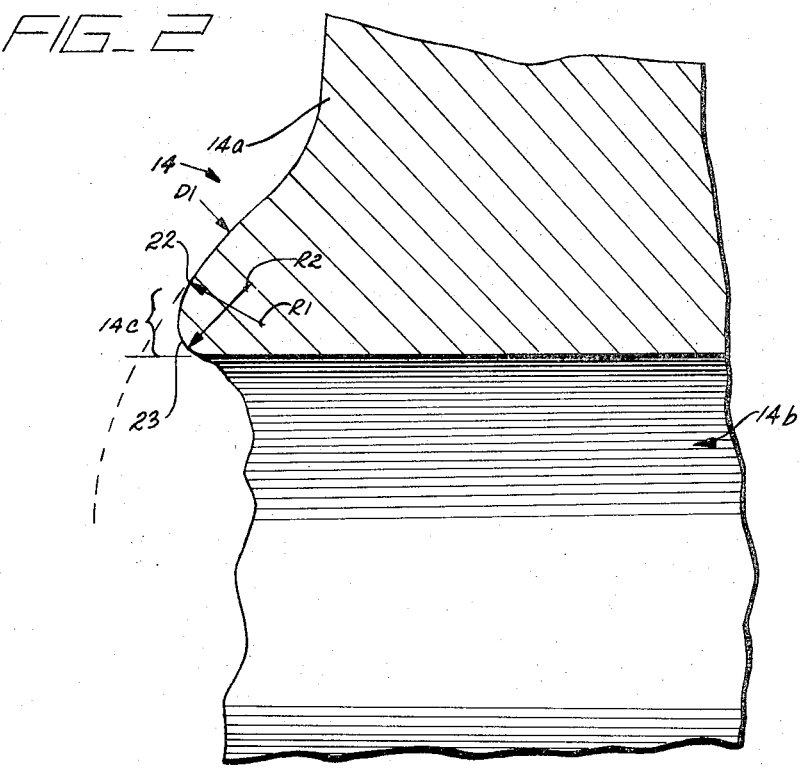
FIG. 2 is an enlarged view of the portion of the ball, indicated by dashed lines in FIG. 1, and showing the recess.

Consider the shape of the annular recessed surfaces 14c and 14d. The recessed surfaces 14c and 14d have the same shape. FIG. 2 is an enlarged view of the portion of the ball indicated by dashed lines in FIG. 1 at the recess 14c. The ball 14 has a spherical segment extending from the base of the stem 14a to point 22 in FIG. 2. From point 22 on to the inside diameter of the passage 14b, the annular recessed surfaces extend in a semi-circular continuous curve around until they form a smooth transition with the inside surface of the passage 14b, thereby forming the annular recessed surfaces.

The construction of the seals and corresponding recessed surfaces are the same. Looking at recessed surface 14c, it will also be seen that the annular recessed surface 14c is formed of a curve of changing radius as it makes the transition from 22 to the inside diameter of the passage 14b. Thus, the curve has a radius R1 from point 22 to point 23 and a smaller radius R2 from point 23 to the inside surface of passage 14b.

Refer now to FIG. 3 which shows a cross-sectional view of the ball 14, the ring 16 and the housing 12 at the recessed surface 14c. The seal 16, before being placed in the valve has a lip 16a as indicated generally by the dash lines of FIG. 3. After being positioned in the valve, the lip is squeezed down to the left (as seen in FIG. 3) into the recess shown in solid lines and is held firmly against the ball 14 to provide a tight seal. The lip 16a maintains a good seal as the seal and ball are worn away because of resiliency of the lip 16a tending to move outward against the ball 14. The seal 16 has an inner annular extending portion 16b which extends into abutting sealing engagement with the recessed surface 14c in an annular shape when the passages 14b and 12a are aligned. As a result, an annular seal portion extends into passage portion 12b.

Although the invention is not limited thereto, the inside diameter of the passage 14b is of approximately the same diameter D3 as the inside diameter of the seal 16. Quite importantly, the inside diameter of both the seal 16 and the passage 14b are of smaller diameter than the larger diameter of the circular passage portions at each side of the ball 14. It is this construction which allows the seals to be dynamic, being displaced axially as the ball 14 rotates the annular recessed surface out of alignment with the seals.

FIG. 4 is a view similar to that shown in FIG. 3 with the ball 14 rotated with the annular recess 14c out of alignment with the seal 16. Of significance is the fact that the larger diameter of the spherical segment of the ball 14 now engages the seal 16, forcing the inner annular-shaped portion 16b to the left as seen in FIG. 4. As soon as the ball 14 is rotated back with the recessed surface 14c in alignment with the seal 16, the inner annular portion 16b of the seal moves back to the position shown in FIG. 3.

Significantly, because of the annular recessed surfaces 14c and 14d, the ball 14 can be constructed with the seals 16 and 17 preloaded against the recessed surfaces. Then, as the ball is rotated, the seals are deformed outwardly. However, due to the resiliency of the seals, any wear of the seals will be compensated for by the tendency of the seals to return to their original position against the annular recessed surfaces.

Consider now the process for making the valve. FIG. 5 is a cross-sectional view of the mold 20 used to form the housing around the ball. As a preliminary step, the ball 14 with its stem is formed with its spherical surface and the cylindrical passage extending therethrough. The ring-shaped recesses are formed on opposite sides of the spherical segment around each end of the passage. The ball 14 is preferably made of a plastic material using an injection molding process or other processes well known in the plastic art, but may also be made of metal. The recesses in the spherical surface may be formed in a step of molding or casting or the spherical surface may be ground off in a later step if desired.

The ring-shaped seal rings are also preformed with an inner diameter sufficiently small to allow the seal rings to mate with the recesses.

Subsequently, the ball is mounted on the ends of a pair of cores 22 and 24 as seen in FIG. 5, along with the seal rings, one seal ring being positioned on each side of the passage through the ball 14. A sealing wall of the seal rings is positioned in abutting engagement with the annular recesses with the combination of the cores 22 and 24 extending completely through the passage formed by the ball and the seal rings.

Next the assembly of the ball, the seal rings and the cores is inserted into the inside of a mold 20 which has an inner configuration corresponding to the desired outer configuration of the valve housing. The cores 22 and 24 have shoulders 22a and 24a which define the diameter of the passage portion 12b immediately adjacent the rings 16 and 17 and also abut the seals. Pressure is applied to the cores 22 and 24 (by means not shown), causing the shoulders 22a and 24a to preload the seals against the annular recesses.

Preferably, the rings are made of a Teflon material and are preloaded up to the limit of their elastic range where they will return by elasticity to their original shape. Next, molten plastic material, preferably, is injected through a passage (not shown) into the interior cavity of the mold 20 around the ball, sealing rings and cores, thereby forming the housing. After the plastic has set, the mold 20 is separated and the housing with the ball and rings is removed. Subsequently, the cores 22 and 24 are removed from the inside of the assembly, leaving the partially completed ball valve. Subsequently, the handle 20 is rigidly connected onto the end of the stem by flaring over the end of the stem, giving a completed ball valve.

Because of the fact that the seals are preloaded up to their elastic limit while engaging the annular recesses, when the ball 14 is subsequently rotated so that the seals and recesses are out of alignment, the seals if made of Teflon, are forced into a higher range of elasticity and, as a result, form a tighter engagement between the seals and the ball.

Although one example of the present invention has been shown by way of illustration, it should be understood that there are many other rearrangements and embodiments of the present invention within the scope of the following claims.

I claim:
1. A rotary valve comprising:
   a. a rotary member having an outer surface forming at least a segment of a sphere, a passage through to opposite sides of the segment, and separate annular recessed surfaces in the segment abutting and surrounding each end of the passage;
   b. a housing comprising an internal surface mounting said rotary member which comprises at least a segment of a sphere in slidable contact with the segment of the sphere of said rotary member, the housing further comprising a passage therethrough comprising a passage portion that is alignable with said rotary member passage and has a larger perimeter adjacent to said rotary member than the inside perimeter of said annular recessed surfaces; and
   c. a pair of resilient annular seals rigidly affixed on opposite sides of the rotary member in between the housing and rotary member, the seals having an annular portion which extends inwardly with respect to the larger perimeter into the housing member passage portion, each said annular seal portion extending into abutting sealing engagement into an annular shape with the respective annular recessed surface when the rotary member passage and housing passage are aligned.

2. The valve of claim 1 wherein each of said passages, recesses and annular seals are circular in cross-section and said annular seals have an outside diameter larger than said annular recessed surfaces, the annular seals also providing an annular shaped abutting sealing engagement with the surface of said rotatable member in the segment of the sphere beyond the outer diameter of said annular recesses.

3. The valve of claim 2 wherein each of said annular seals has an inside diameter substantially equal to the diameter of said segment passage.

4. The valve of claim 1 wherein said annular recessed surfaces form a curve extending in a smooth transition from the surface of the sphere segment to the segment passage.

5. The valve of claim 1 wherein said seals are plastic.

6. The valve of claim 1 wherein said housing is plastic.

7. The valve of claim 1 wherein said rotary member is plastic.

8. The valve of claim 1 wherein the annular portion of each seal is preloaded against the corresponding annular recessed surface when the rotary member passage and housing passage are aligned.

9. The valve of claim 1 wherein said housing is a unitary molded body.

10. A rotary valve comprising:
   a. a rotary member having a connected stem, an outer surface forming at least a segment of a sphere around one end of the stem, a cylindrical-shaped passage passing through the segment, and separate annular recessed surface in the segment abutting and surrounding each end of the passage;
   b. a housing comprising an internal surface mounting said rotary member which comprises at least a segment of a sphere in slidable contact with the segment of the sphere of said rotary member, the housing further comprising a passage therethrough comprising a circular passage portion that is coaxially alignable with and has a larger diameter adjacent to said rotary member than the diameter of said segment passage; and c. a pair of resilient annular seals rigidly affixed in between the segment portion of the rotary member and the housing, one at each end of the segment passage so that when the passages are aligned, the seals are coaxial with both passages, the annular seals each having an inner annular segment which extends inwardly into the housing passage portion and is in abutting sealing engagement in an annular shape with the corresponding annular recessed surface, the inner annular segment being free on the opposite side from the segment to move back and forth in the housing passage with rotation of the rotary member.

11. The valve of claim 10 wherein the annular portion of each seal is preloaded against the corresponding annular recessed surface when the rotary member passage and housing passage are aligned.

12. The valve of claim 10 wherein said housing is a unitary molded body.

* * * * *